United States Patent
Carroll

(10) Patent No.: US 6,728,356 B1
(45) Date of Patent: Apr. 27, 2004

(54) METHOD AND APPARATUS FOR PROVIDING TELEPHONY SERVICES BY SWITCH-BASED PROCESSING OF MEDIA STREAMS

(75) Inventor: Martin D. Carroll, Watchung, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/549,641

(22) Filed: Apr. 14, 2000

(51) Int. Cl.[7] .......................... H04M 3/42; G06F 15/173
(52) U.S. Cl. .............................. 379/201.01; 379/201.05; 379/211.02; 709/225
(58) Field of Search .................. 379/211.02, 201.05, 379/201.01; 709/225

(56) References Cited

U.S. PATENT DOCUMENTS

| | | | |
|---|---|---|---|
| 5,991,292 A | 11/1999 | Focsaneanu et al. | 370/352 |
| 5,999,609 A | 12/1999 | Nishimura | 379/201.01 |
| 6,009,469 A | 12/1999 | Mattaway et al. | 709/227 |
| 6,145,002 A | * 11/2000 | Srinivasan | 709/225 |
| 6,496,578 B1 | * 12/2002 | Chen et al. | 379/211.02 |

OTHER PUBLICATIONS

M. Jackson and P. Zave, "Distributed Feature Compositiion: A Virtual Architecture for Telecommunications Services," IEEE Transactions on Software Engineering, vol. 24, No. 10, pp. 831–847, Oct. 1998.

"Parlay API Business Benefits White Paper," The Parlay Group, http://www.parlay.org, Issue 2.0, pp. 1–25, Jan. 2000.

* cited by examiner

*Primary Examiner*—Ahmad Matar
*Assistant Examiner*—Thjuan P Knowlin

(57) ABSTRACT

Telephony services are implemented using a media-control framework in which a media switch controls the mixing of multiple participant streams. A connection is established between the media switch and each of the participants in a given call or other communication. The media switch then implements a desired telephony service by controlling the mixing of media streams in accordance with multiple permit sets and multiple want sets, each of the permit sets and each of the want sets being associated with a given media stream of a given participant. A particular one of the permit sets specifies one or more additional participants that are permitted to receive a send flow of the given stream in conjunction with the telephony service, while the corresponding one of the want sets specifies one or more additional participants from which the given participant wants to receive a receive flow of the given stream in conjunction with the telephony service. The media switch utilizes the permit sets and the want sets to generate onto each receive flow for the one or more media streams the mix of all the send flows for the one or more media streams that satisfy the specified permissions and wants. The media switch may be implemented in a nondistributed manner, or in a distributed manner with a switch controller and one or more mixers.

29 Claims, 14 Drawing Sheets

RECEIVE FLOW

SEND FLOW

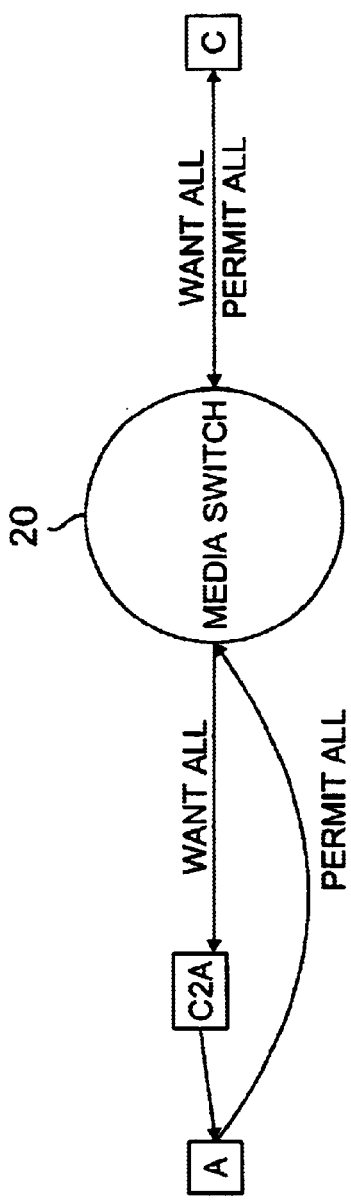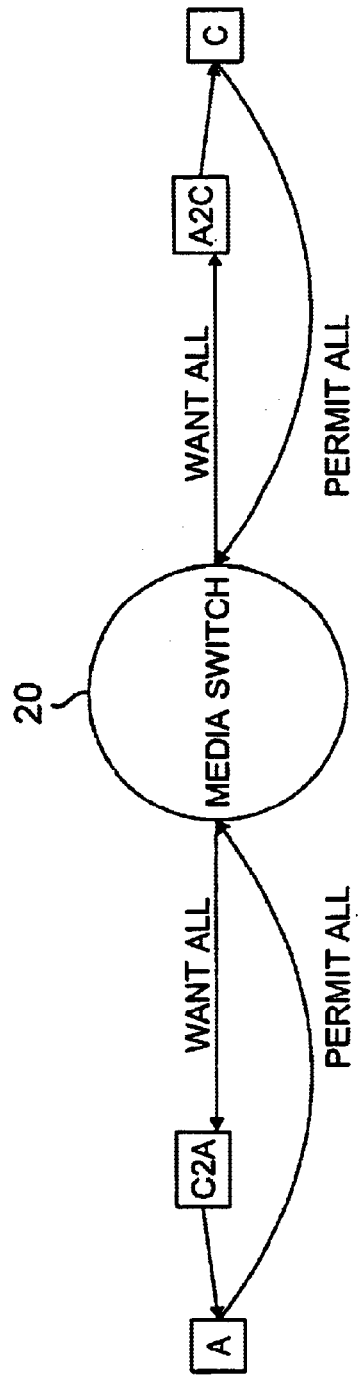

METHOD AND APPARATUS FOR PROVIDING TELEPHONY SERVICES BY SWITCH-BASED PROCESSING OF MEDIA STREAMS

FIELD OF THE INVENTION

The present invention relates generally to telecommunication systems, and more particularly to the provision of telephony services in such systems.

BACKGROUND OF THE INVENTION

Many advanced telephony services require the ability to analyze, modify, redirect, duplicate and otherwise manipulate the media streams involved in a given call. Unfortunately, existing programming frameworks provide little or no support for such media control.

Implementing media control for telephony services such as translation, adding participants, side conversations, etc. often requires that the devices involved have certain capabilities, such as sending a given stream to more than one target device, changing the set of target devices to which a given stream is sent over the course of a call, and mixing a number of received streams. However, few real world devices have these capabilities. For example, many PC-based H.323 applications can send an audio stream to only one destination which cannot be changed over the course of a call, and generally cannot mix streams. As another example, most circuit-packet voice gateways can send a packetized audio stream to only one destination, which cannot be changed over the course of a call, and most such gateways cannot mix streams.

Although it is believed that there is no existing device which provides all of the above noted capabilities, a number of partial solutions are known in the art. These include Internet protocol (IP) multicasting, use of a central mixer, and reprogramming.

IP multicasting can be used to send a given IP-transported stream to more than one target device, and to change the set of target devices to which the given stream is sent over the course of a call. The IP multicasting approach is described in greater detail in, e.g., W. Richard Stevens, "UNIX Network Programming," Vol. 1, 2nd Edition Prentice Hall, 1998. More specifically, when a stream is created, one can also create a new multicast group that represents all the intended targets of that stream, and the stream can then be sent to that group. In order to send the stream to a particular device, that device is added to the group. In order to stop sending the stream to the particular device, that device is removed from the group.

Unfortunately, this approach fails to provide a complete media-control solution. One problem is that IP multicasting provides no ability to mix streams. In addition, not all hosts, and very few routers, currently support IP multicasting. Furthermore, in advanced telephony services applications, it is often the sender of a stream that wants to specify who should receive that stream, but IP multicasting entities generally specify those multicast groups that they want to receive. As an example, when a given device A wants to send its media stream to another device B, the device A generally must send a control message to B telling B to join the multicast group corresponding to that stream. This type of "backwards" protocol is confusing, and there is no guarantee that devices will adhere to it.

Although a central mixer can be used to send a mix of streams to a given device, this approach also fails to provide a complete media-control solution. More particularly, conventional central mixers generally send to each participant in a call the mix of all the other participants, and the mixing function for a given participant cannot be changed.

There are also a number of problems associated with the above noted reprogramming approach. For example, not all real-world devices can be reprogrammed by third parties. In addition, reprogramming all of the devices that can be reprogrammed would be a monumental undertaking, to say nothing of the ongoing maintenance.

As noted previously, existing programming frameworks for telephony services provide insufficient control of media streams. For example, the Parlay framework, as described at http://www.parlay.org, allows a given audio file to be played to a specified endpoint, optionally collecting dual-tone multiple-frequency (DTMF) information during the playing of the audio file. Other frameworks, such as the Advanced Intelligent Network, as described in "AINGR: Switching Systems," Document number GR 1298-CORE, 1998, provide slightly more powerful media control, but in the context of an overall framework that is unduly complex, restrictive, and difficult to use. Another example of a conventional media control framework is the Touring Machine (TM) system, which provides a high-level API that enables the easy creation of a wide range of distributed multimedia applications. However, certain telephony services may be unduly difficult to implement in the TM framework.

Another conventional media control framework is the Distributed Feature Composition (DFC) system described in M. Jackson and P. Zave, "Distributed feature composition: A virtual architecture for telecommunications. services," IEEE Transactions on Software Engineering, 24(10):831–847, October 1998. In DFC, each individual feature, such as call forwarding, call waiting, etc. of each participant in a call is represented by an individual "device." DFC arranges all devices in a call into a directed acyclic graph. If there is an edge in that graph from device A to device B, then a bi-directional media, stream logically flows between A and B. A DFC device can manipulate the contents of the streams that it is sending and receiving. DFC also provides a mechanism for a device to send media-control messages to downstream devices. Because in DFC media streams flow between features, and because DFC has no notion of participants, certain telephony services are difficult to implement in the DFC framework.

As is apparent from the foregoing, a need exists for an improved framework that provides the media control capabilities required to implement a wide range of telephony services in an efficient manner.

SUMMARY OF THE INVENTION

The present invention provides an improved media-control programming framework that is particularly well-suited for manipulation of media streams in the implementation of telephony services.

In accordance with the invention, telephony services are implemented through a media switch which controls the mixing of multiple participant media streams. A connection is established between the media switch and each of the participants in a given call or other communication. For example, a given participant may establish a connection with the media switch by opening a control channel to a port of the switch, such that control messages can be exchanged between the switch and a device associated with the participant. The media switch then implements a desired telephony service by controlling the mixing of media streams in accordance with multiple "permit sets" and multiple "want sets," each of the permit sets and each of the want sets being associated with a given media stream of a given participant.

A particular one of the permit sets specifies one or more additional participants that are permitted to receive a send flow of the given stream in conjunction with the telephony service, while the corresponding one of the want sets specifies one or more additional participants from which the given participant wants to receive a receive flow of the given stream in conjunction with the telephony service. The media switch utilizes the permit sets and the want sets to generate onto each receive flow for the one or more media streams the mix of all the send flows for the one or more media streams that satisfy the specified permissions and wants.

Every media stream handled by the media switch at a given point in time may be associated with a single on-going communication. Either a single media switch or multiple media switches may be utilized to control the media streams associated with multiple on-going communications.

In accordance with another aspect of the invention, a device may be inserted into one of the receive or send flows by a corresponding participant sending a control message to the media switch directing the media switch to change a receive address or a send address of the corresponding stream to an address associated with the device. The media switch may also allow a device to be inserted into one of the receive or send flows by a corresponding participant by the participant directing the media switch to internally apply one or more operations of the inserted device to the corresponding media stream. In the latter case, the media switch may maintain for each of the streams controlled thereby a stack storing information regarding devices inserted into send or receive flows by a. corresponding participant.

In accordance with a further aspect of the invention, the media switch may be implemented in a nondistributed manner, e.g., as a single entity which handles all of the media streams involved in one or more communications, or in a distributed manner with a switch controller and one or more mixers. In the latter case, the media switch may include a plurality, of mixers, with each of the mixers handling a subset of the media streams controlled by the media switch.

Advantageously, the media-control framework of the present invention is easy to understand and use, enables a wide range of advanced telephony services, and is both efficient and scalable. These and other features and advantages of the present invention will become more apparent from the accompanying drawings and the following detailed description.

BRIEF DESCRIPTION OF THE DRAWINGS

FIGS. 10 and 11 show examples of translation services implemented using the media-control framework of the present invention.

DETAILED DESCRIPTION OF THE INVENTION

Figure 1:
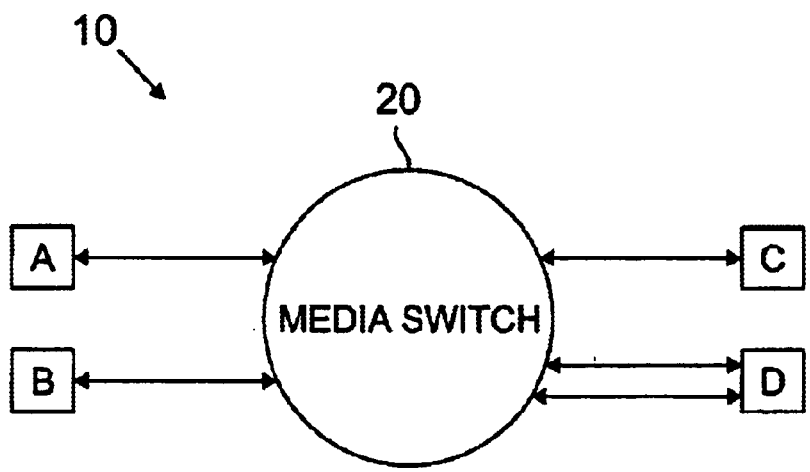
FIG. 1 shows a block diagram of a portion of a system in which the media-control framework of the present invention may be implemented.

FIG. 1 shows an illustrative embodiment of a communication system 10 in accordance with the present invention. The system 10 comprises a media switch 20, and a number of devices, designated A, B, C and D. The media switch 20 controls the flow of media streams between the devices A, B, C and D using a media-control framework (MCF) in accordance with the present invention. The MCF in the illustrative embodiment provides an intermediate entity that implements the necessary switching and mixing of media streams for telephony services.

The term "device" as used herein should be understood to include any type of module, box or other arrangement of elements, whether implemented in hardware, software, firmware or various combinations thereof, for providing at least a portion of at least one telephony service.

In the illustrative embodiment, the devices A, B, C and D do not directly send each other media streams. Instead, each device exchanges zero or more bidirectional streams with the media switch 20. For example, in the particular arrangement shown in FIG. 1, devices A, B, and C are each exchanging one stream with the media switch 20, while device D is exchanging two streams with the media switch 20.

It will be assumed for purposes of illustration that all streams handled by the media switch in the illustrative-embodiment are transported using the real-time protocol (RTP), as described in, e.g., http://www.ietf.org/internet-drafts/draft-ietf-avt-rtp-new-03.txt. A circuit-switched stream or other type of non-RTP stream can be indirectly controlled by, e.g., first transforming it into an RTP stream, typically using a conventional circuit-packet gateway. It should be emphasized that this is by way of example only, and the invention can be implemented using other protocols, and other arrangements of switches and devices.

The term "media stream" as used herein should therefore be understood to include any type of information stream associated with a call or other communication in a communication system, and may be an RTP stream, an IP stream, or other type of stream, as well as combinations of these streams.

Figure 2:
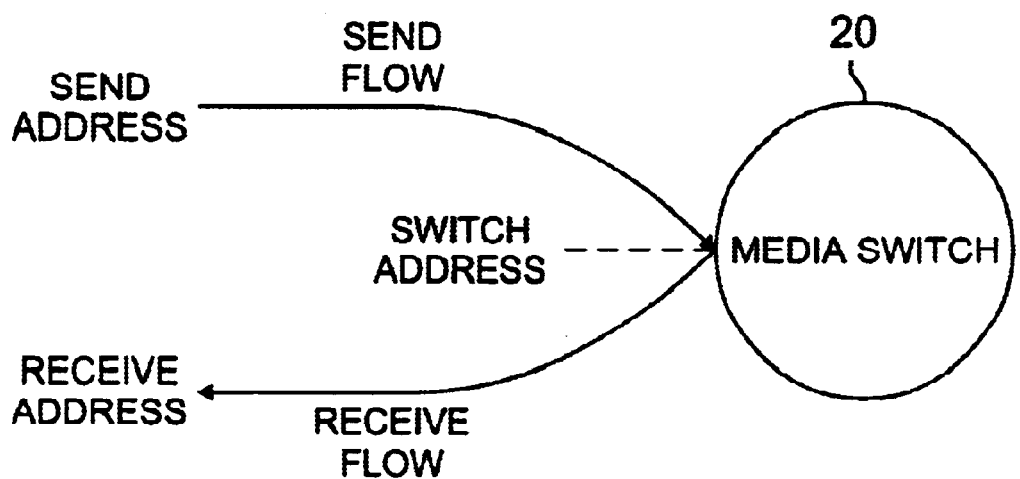
FIG. 2 shows an example of a media stream suitable for use in a media-control framework of the present invention.

FIG. 2 shows an example of a media stream in greater detail. Each bidirectional stream in this example comprises two unidirectional flows of media packets. The flow toward the media switch 20 is referred to as the send flow, and the flow from the media switch is referred to as the receive flow. Each stream has three associated RTP transport addresses. The send address is the source address of the send flow. The receive address is the destination address of the receive flow. The switch address is both the destination address of the send flow and the source address of the receive flow. For maximum flexibility when implementing advanced services, the send and receive addresses of a given media stream may be different, and either address may be changed at any time. The switch address, on the other hand, generally never changes. Further, either address may have a special value none. If the send address is none, the switch 20 will drop all packets that it receives on the send flow. If the receive address is none, the switch will not send any packets on the stream's receive flow.

If an RTP packet arrives at a stream's switch address, but the source address of that packet is not the stream's send address, then the media switch 20 drops that packet. This design prevents attackers from injecting RTP packets into a participant's streams.

The contents of a stream's send flow are completely determined by the device sending that flow, outside of the scope of the MCF. The contents of a stream's receive flow are determined by the media switch 20.

Figure 3:
FIG. 3 illustrates the concept of a switch participant.

Before explaining how the switch determines the contents of a receive flow, the concept of "participant" will be described, in conjunction with FIG. 3.

To use the media switch 20, a user opens a control channel to a known port on that switch. The user can then exchange control messages with the media switch over that channel, as illustrated in FIG. 3. Opening, such a channel makes the user a participant on the media switch. An application-programming interface, (API), which a participant uses to exchange control messages with the media switch 20, will be described in greater detail below.

When a user becomes a participant, the switch assigns the user an identifier that is unique among all the participants on the switch. Participants that need to learn the identifiers for other participants can do so via an appropriate higher-level system mechanism, e.g., a suitable higher-level programming framework, as will be apparent to those skilled in the art.

Figure 4:
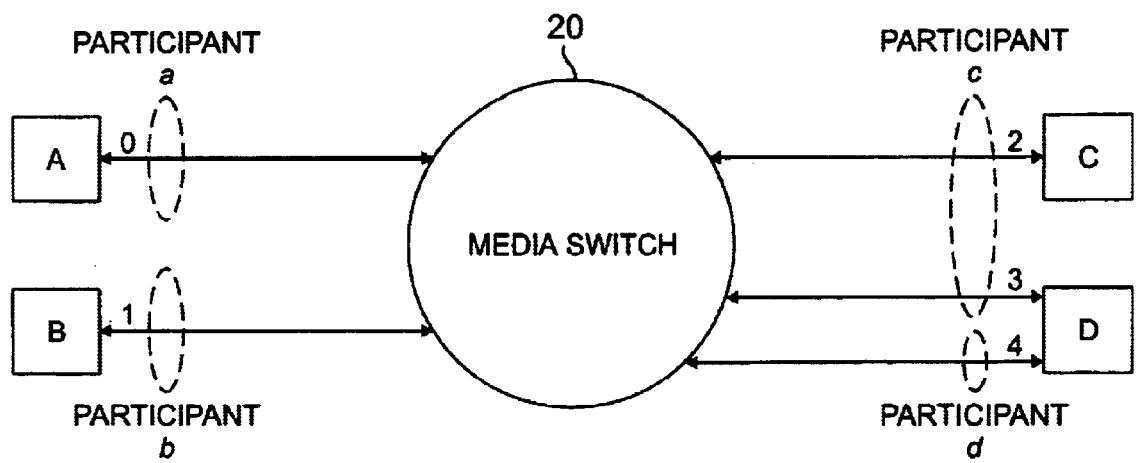
FIG. 4 shows an example of a set of stream owners.

Using control messages, a participant can, at any time, create new streams. In addition, a participant owns the streams that it creates. FIG. 4 shows an example in which, for a set of streams 0 through 4, participant a owns stream 0, participant b owns stream 1, participant c owns streams 2 and 3, and participant d owns stream 4. Note that the MCF of the present invention places no restrictions on the correspondence between participants and devices. More specifically, a single participant can own streams handled by more than one device, and more than one participant can own streams handled by a single device. A participant can, at any time, delete any stream it owns.

It will be assumed for purposes of illustration that every stream handled by the media switch 20 in the illustrative embodiment is logically contained in exactly one call. When a user creates a stream, the user must supply the identifier for its containing call. The identifier can be any string. The MCF does not interpret call IDs, other than to compare them for equality. For simplicity of description, it will also be assumed that all of the streams in the FIG. 4 example are associated with the same call.

A participant can control the streams it owns, in the following manner. The owner of a stream can specify which other participants are permitted to receive that stream's send flow, i.e., can specify a "permit set" for each of its owned streams. In the example shown in FIG. 5, participant a permits everyone else to listen to stream 0; participant b permits participants c and d to listen to stream 1, participant c permits participants b and d to listen to stream 2 and permits no one to listen to stream 3; and participant d permits everyone else to listen to stream 4. By default, a newly created stream has an empty permit set. A participant can change the permit set of any of its streams at any time.

Figure 5:
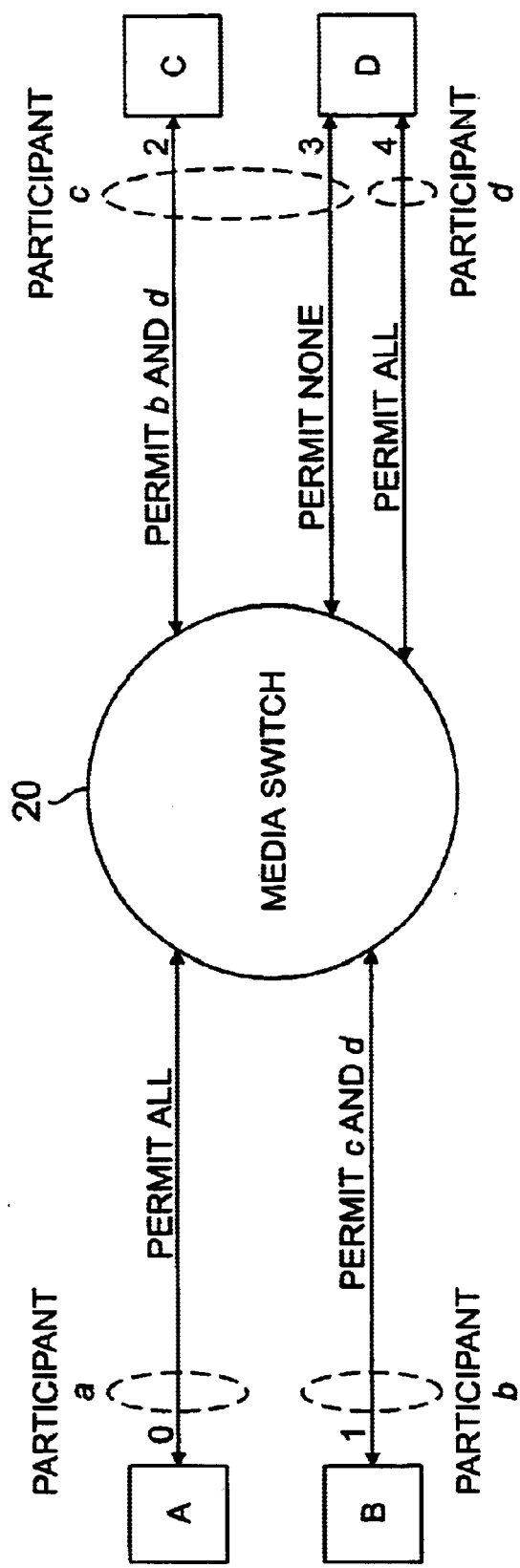
FIG. 5 shows stream permit sets for the stream owners of FIG. 4.

Notice that the permit all designation for a given participant in the FIG. 5 example designates "everyone else," i.e., all participants other than the given participant. In the illustrative embodiment, a participant cannot listen to any of its own send flows, since most advanced telephony services do not need to listen to their own send flows. However, if a given application includes one or more services that require this capability, the capability can be provided in a straightforward manner by a minor extension to the illustrative embodiment, as will be apparent to those skilled in the art.

Figure 6:
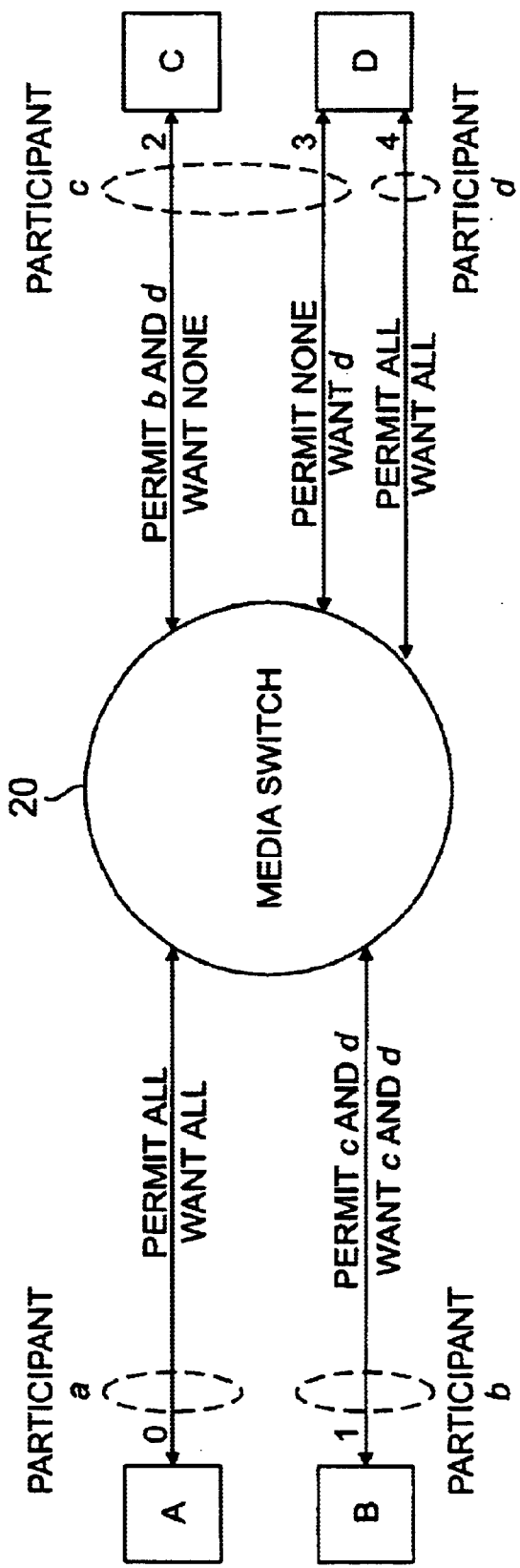
FIG. 6 shows stream want sets for the stream owners of FIG. 4.

The owner of a stream can also specify which other participants it wants to listen to on that stream's receive flow, i.e., a participant can specify a "want set" for each of its owned streams. In the example of FIG. 6, participant a wants to listen to everyone else on stream 0; participant b wants to listen to participants c and d on stream 1; participant c wants to listen to no one stream 2 and wants to listen to participant d on stream 3; and participant d wants to listen to everyone else on stream 4. By default, a newly created stream has an empty want set. A participant can change the want set of any of its streams at any time.

Given all these permit and want sets, the media switch 20 generates onto each receive flow the mix of all the send flows that satisfy all the specified permissions and wants. More specifically, the switch generates onto stream r's receive flow the mix of the send flows for all streams s such that the following are true: r and s are in the same call; r wants s's owner; and s permits r's owner.

In conventional circuit switches, such as those described in, e.g., S. Keshav, "An Engineering Approach to Computer Networking: ATM Networks, the Internet, and the Telephone Network," Addison-Wesley, 1997, a given input port is typically switched to exactly one output port, and at most one input port can be switched to a given output port. The permit and want sets as described above advantageously violate both of these restrictions. Hence, the media switch 20 of the present invention may be viewed as a generalization of a traditional circuit switch in which both of these restrictions are lifted. Furthermore, because the media switch 20 can switch more than one input stream to a given output stream, the media switch generally should also provide mixing functionality to merge all the streams being sent to a given output stream.

Figure 7:
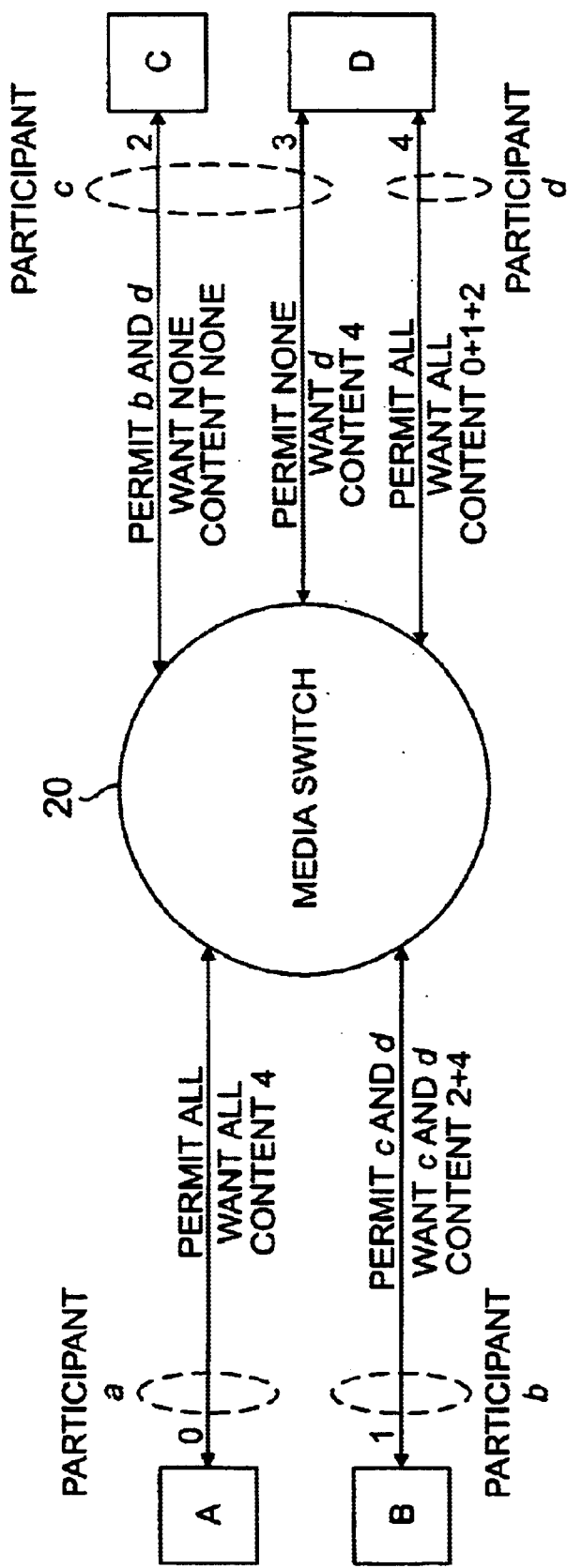
FIG. 7 illustrates receive-flow contents for the example of FIGS. 4 through 6.

FIG. 7 shows the actual contents of each receive flow in the current example. The plus sign "+" denotes the mix operation. The receive flow for stream 0, which wants everyone else, actually contains only stream 4 because only that stream permits participant a to listen. The receive flows for the other streams are determined in a similar manner. Whenever a participant changes a permit set or a want set, the media switch 20 updates the contents of all the affected receive flows.

In the preceding example some of the permit and want sets were explicit lists of participants, whereas others were the special value all. To enable a wide range of telephony services, the MCF. of the present invention is configured to allow a participant to specify permit and want sets in either of the following forms:

1. An explicit (possibly empty) list of participant identifiers; or
2. The special value all together with an explicit (possibly empty) list of participant identifiers. This value represents all participants, other than the listed participants, on the same media switch.

Note that the actual set of participants denoted by an all changes as participants enter and leave the switch.

The manner in which devices are inserted into flows will now be described. When implementing advanced telephony services it is often necessary to insert devices into existing flows. In the illustrative embodiment of the invention, devices can be inserted into and removed from flows by changing a stream's send and receive addresses.

Figure 8:
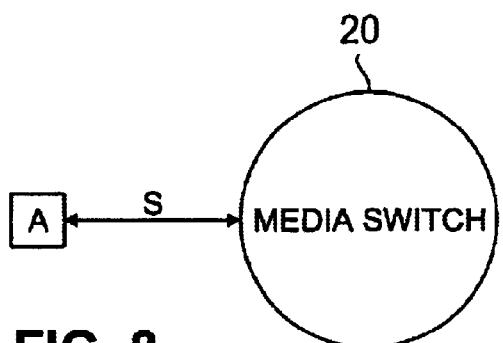
FIG. 8 shows an example of a stream between a device and a media switch.
Figure 9A:
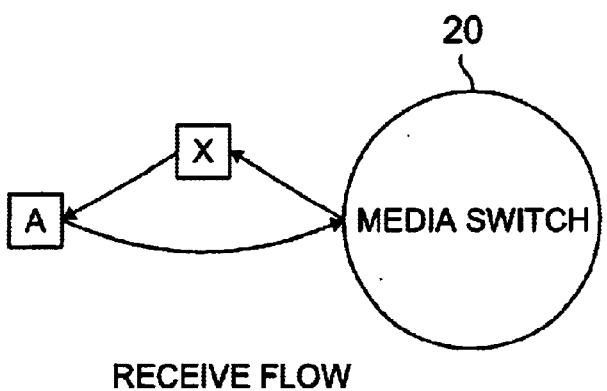
FIGS. 9(a) and 9(b) illustrate-the manner in which a device may be inserted into the receive flow and the send flow of the stream of FIG. 8.

FIG. 8 shows a device A exchanging a stream S with media switch 20. Suppose that a user wants to insert a device X into the stream's receive flow, as shown in FIG. 9(a). To effect this change, the user can do the following:

1. Create the device X.
2. Tell the media switch 20 to change the stream's receive address to that of X.
3. Tell X to send its packets to A's address.

Steps 1 and 3 may be performed outside the scope of the MCF. Step 2 can be done by sending the switch the appropriate control message.

Notice that after inserting device X, the RTP packets that A receives have a different source transport address (X instead of the switch). Some real devices don't like the source address of a stream that they're receiving to change. To accommodate such devices, the MCF of the present invention provides a device "push" facility, which will be described in greater detail below.

Figure 9B:
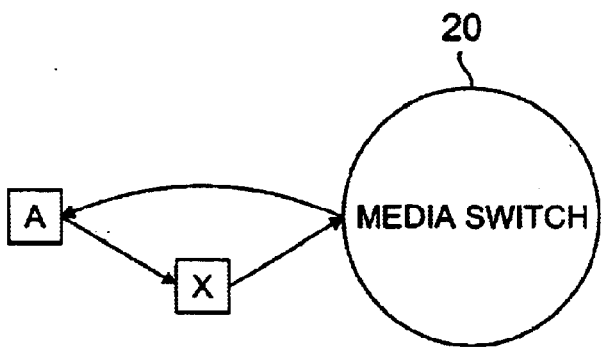

Now suppose that the user wants to insert a device into the stream's send flow, as shown in FIG. 9(b). To effect this change, the user can do the following:

1. Create the device X.
2. Tell the switch to change the stream's send address to that of X.
3. Tell X to send its packets to the stream's switch address.
4. Tell A to retarget its packets to X's address.

Steps 1, 3, and 4 may be performed outside the scope of the MCF. Step 2 can be done by, sending the switch the appropriate control message. As noted previously, many real devices cannot retarget their streams, and such devices are accommodated by the device "push" facility to be described below.

To remove a device from a flow, the user can adjust transport addresses in a similar manner. No additional switch control messages are needed.

Note that in the MCF of the present invention, the network entity that handles a participant's MCF control messages may be different from the network entity (or entities) that handle(s) that participant's media streams. This design permits participants and their devices to be implemented in a distributed fashion. For example, a participant's streams might be handled by a media gateway that is itself controlled via the media gateway control protocol (MGCP), as described, e.g., at http://www.ietf.org/internet-drafts/draft-huitema-megaco-mgcp-v0r1-05.txt, by a process P running on some other host. P can then handle the participant's MCF control messages. Thus, MCF doesn't require existing devices to be reprogrammed.

Note also that the media switch 20 is not a single point of failure in MCF, for two reasons. First, different calls can use different switches. Second, the switch itself can be implemented in a robust, distributed fashion, as will be described in greater detail below.

A more detailed example illustrating the manner in which the above-described MCF may be used to implement advanced telephony services will now be presented.

FIG. 10 shows the results of a call process setup between participant a and participant c in this example. Participant a owns the streams on the left, and participant c owns the streams on the right. Participant a invokes a translation service by creating the device C2A as shown, using a mechanism outside of the scope of the MCF. This translation service may translate the speech or other information flowing from device C to a language desired by participant a at device A. If participant c desires to invoke a complementary translation service, participant c creates the device A2C, as shown in FIG. 11, also using a mechanism outside the scope of MCF. Participant c then inserts A2C into his stream's receive flow, in the manner described previously. If device C doesn't provide the necessary functionality for this insertion, participant c can use the MCF device "push" facility to be described below.

Figure 12:
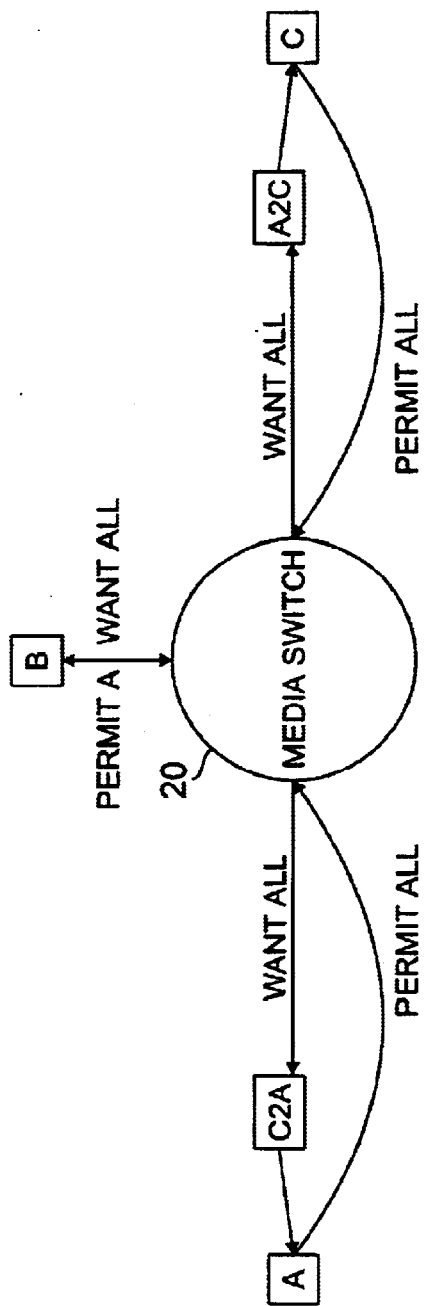
FIGS. 12–15 illustrate examples of arrangements associated with implementation of a side conversation using the media-control framework of the present invention.
Figure 13:
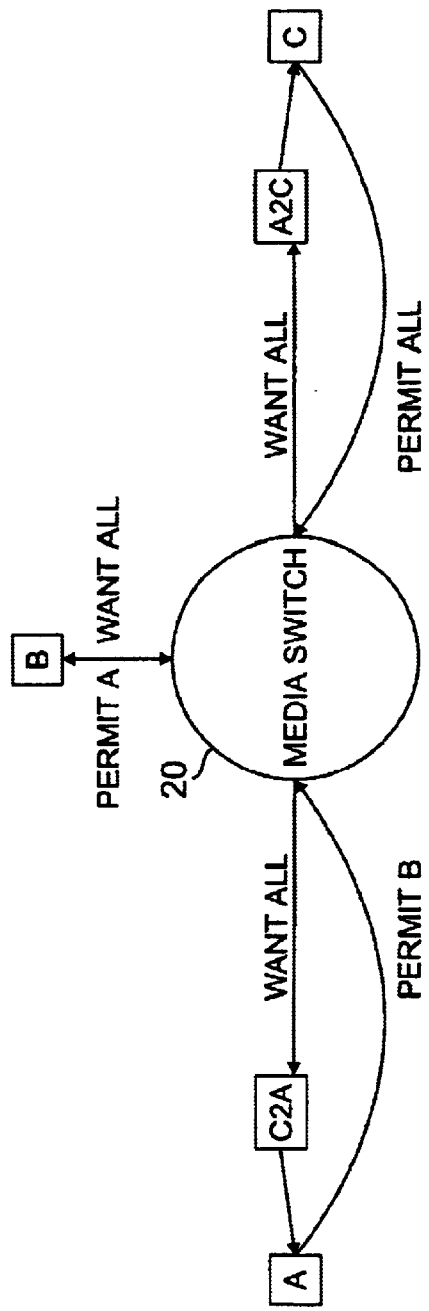

Assume then that participant a wants to engage in a side conversation with a participant b during the ongoing call. Participant b creates a stream and specifies that only a may listen to it. The resulting diagram is shown in FIG. 12. To begin the side conversation with participant b, participant a simply tells the media switch 20 that only participant b may listen to participant a's stream, as shown in FIG. 13. Note that this arrangement ensures that participant c cannot hear what either participant a or participant b are saying in the side conversation, although both a and b can hear what participant c is saying.

Figure 14:
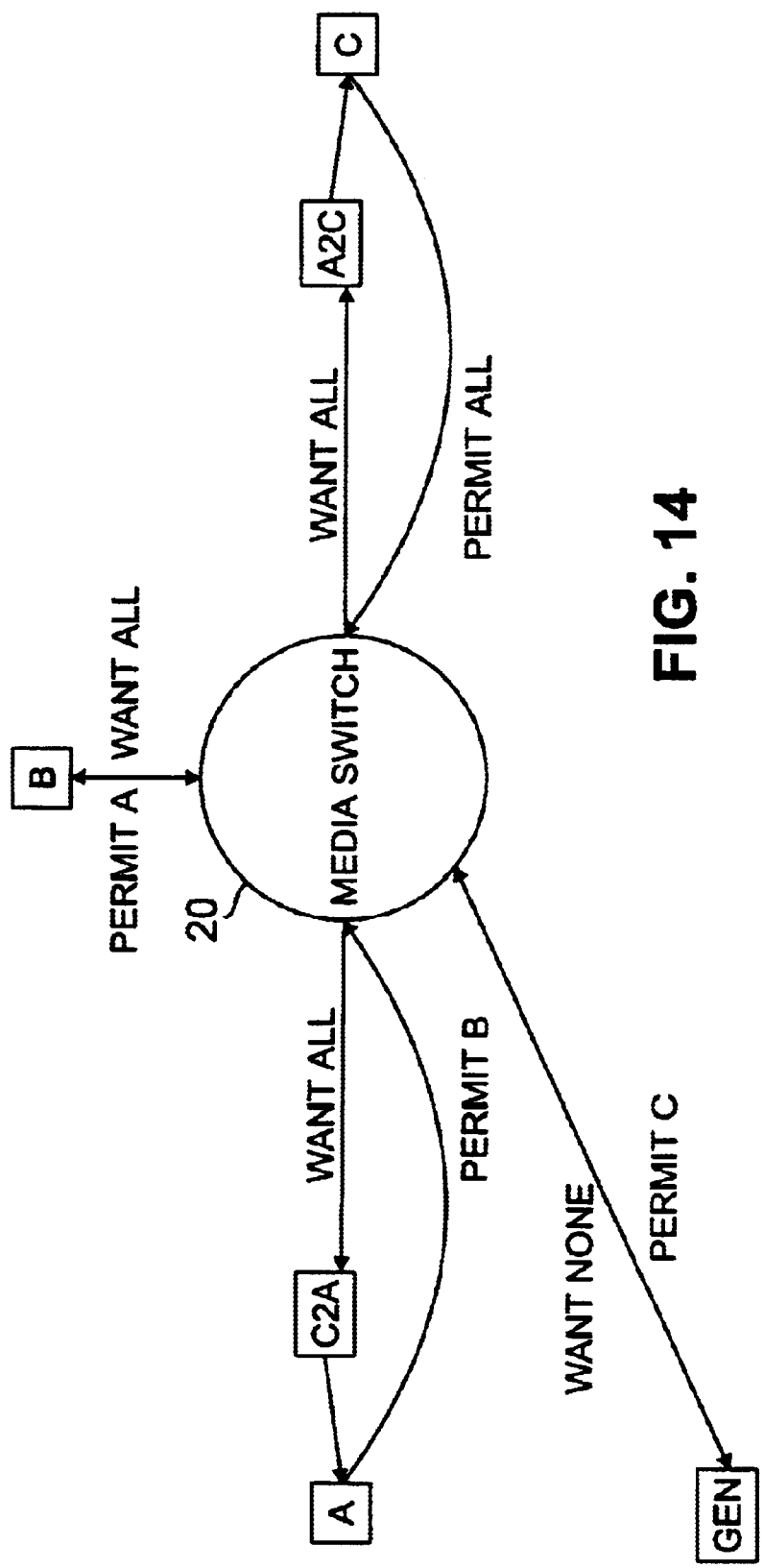

Participant a may then want to add a noise generator in order to deliver the appropriate type of background noise to participant c while the side conversion between a and b is taking place. This ensures that participant c will not suddenly hear silence at the commencement of the side conversation and thereby become suspicious of its existence. To add the noise generator, a creates a device GEN as shown in FIG. 14, using a mechanism outside the scope of the MCF. For example, a might spawn a process that generates the desired noise stream. Participant a then asks the media switch 20 to create a new stream. The switch does so and then tells the switch's transport address for that stream. Participant a relays this destination address to the device GEN. Finally, a specifies that only c may listen to the new stream.

Figure 15:
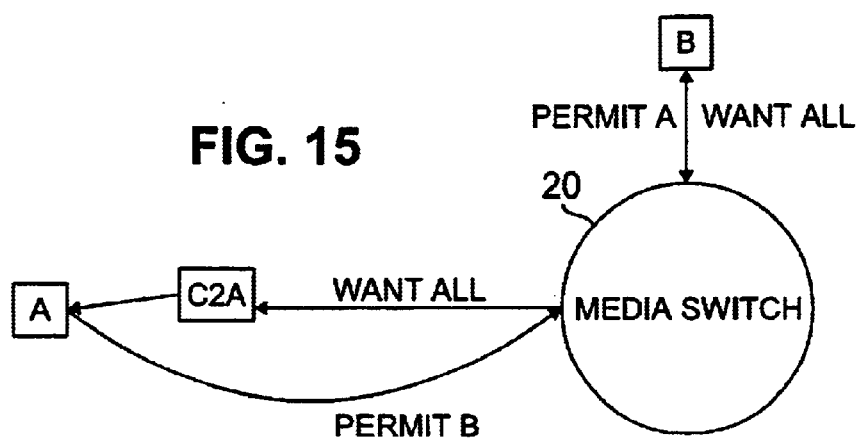

When participant c hangs up, participant a may be informed of that hang up by a mechanism outside the scope of the MCF. Participant a may then "delete" both the GEN device and the stream that GEN was sending. The resulting diagram is shown in FIG. 15.

The above-noted device "push" facility provided by the MCF of the present invention will now be described in greater detail. As explained previously, many real devices don't provide the functionality required for inserting devices into existing flows. The device push facility allows a given user to insert devices into all its streams no matter what the capabilities of the devices handling those streams might be. In accordance with the invention, this device push facility may be implemented within the media switch 20 in the form of a stack on the switch side of every stream. A user can push devices onto and pop devices from the stack.

Figure 16:
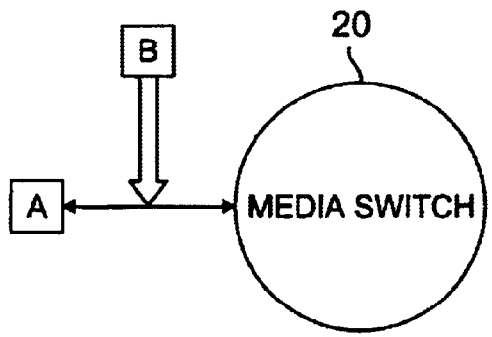
FIGS. 16 and 17 illustrate the pushing of a device onto a stream in accordance with the invention.
Figure 17:
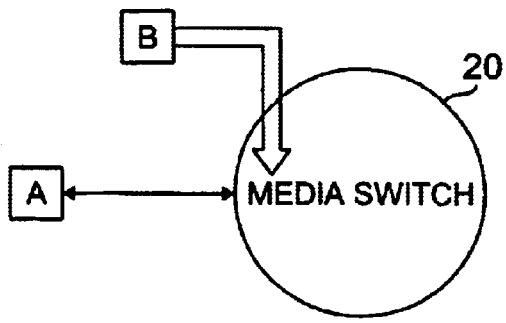
Figure 18:
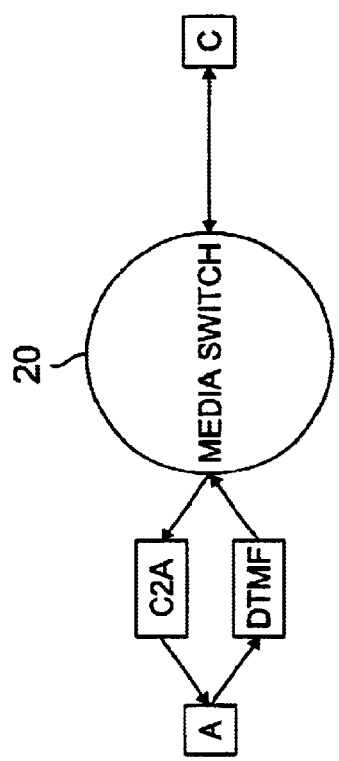
FIG. 18 shows the manner in which DTMF detection can be implemented in the example of FIG. 10.

For example, suppose that in the FIG. 16 arrangement a user wants to insert device B into one of the flows for the indicated stream, but device A doesn't provide the required functionality. Instead of inserting B, the user can push B onto the stream's stack, as shown in FIG. 17. This push operation doesn't affect the switch's transport address for the stream. Hence, A need not retarget the stream's send flow, and the packets in the receive flow will not have their source transport address changed. The switch internally applies device B's operations to the stream.

Pushing a module onto a stream does not change the stream's switch address. Further, even if a stream's receive address is none, the switch will still propagate the packets on the stream's receive flow up the stream's module stack, so that the modules on that stack have a chance to process the flow.

The MCF may not be able to anticipate all the possible kinds of devices that its users might want to push. Hence, the media switch 20 should preferably be configured to dynamically load the code for new devices. Because that code will manipulate a media stream, most MCF users will want to implement it in an efficient language, such as C or C++. However, neither C nor C++ provides a portable mechanism for dynamically loading code.

The programming language Java, on the other hand, does provide such a mechanism. In addition, device implementers who want to program in C or C++ can use Java's native-code facility. However, some Java platforms place restrictions on the functions and libraries that can be used within C and C++ native code. In addition, C and C++ code when executed within a Java virtual machine can experience efficiency problems (e.g., pauses resulting from garbage collection) that the same code would not experience when executed in a standalone manner. Therefore, although the above-described push facility can be implemented in Java, such an implementation may not be maximally efficient. Nonetheless, for simplicity of illustration, the push facility will be further described below in terms of Java.

In the following, "upstream" means up a stream stack, toward the exterior of the switch; "downstream" means down a stream stack, toward the interior of the switch.

To create a pushable MCF device, a user may extend the following Java PushableDevice class:

```
class PushableDevice {
    public PushableDevice( ) ;
    public void init (String initArg) ;
    protected void pushed( ) ;
    protected void popped( ) ;
    protected void senddown(DatagramPacket packet) ;
    protected void sendup(DatagramPacket packet) ;
    protected void recvdown(DatagramPacket packet) ;
    protected void recvup(DatagramPacket packet) ;
    public void close( ) ;
}
```

To push a device onto a stream, a user may send the media switch 20 a pushDevice control message containing the following information: the identifier for the stream on which to push the device; the complete Java class name of the device; and an arbitrary string that the switch will use to initialize the device.

When the media switch 20 receives this message, the switch dynamically loads that class (if it isn't already loaded) and creates a new instance of that class. The switch then invokes the init method on that object, passing it the given string. After pushing or popping the device on the stream's stack, the switch invokes the pushed or popped method on the device.

Whenever a device receives a downstream RTP packet, the media switch 20 invokes the recvdown method on that device, passing it that packet. The PushableDevice implementation of recvdown simply invokes the senddown method, which causes the packet to be sent to the next device downstream, or to the mixer core if there is no such device. Similarly, whenever a device receives an upstream RTP packet, the switch invokes the recvup method on that device, passing it that packet. The PushableDevice implementation of recvup simply invokes the sendup method on the packet, which causes the packet to be sent to the next device upstream, or to the stream's receive address if there is no such device.

Finally, when a stream is deleted, the switch calls the close method on all the devices pushed on that stream.

It should be noted, that the above-described MCF device push facility may be implemented using the design of the Unix STREAMS module facility, as described in, e.g., W. Richard Stevens, "Advanced Programming in the UNIX Environment," Addison-Wesley, 1992.

Figure 24:
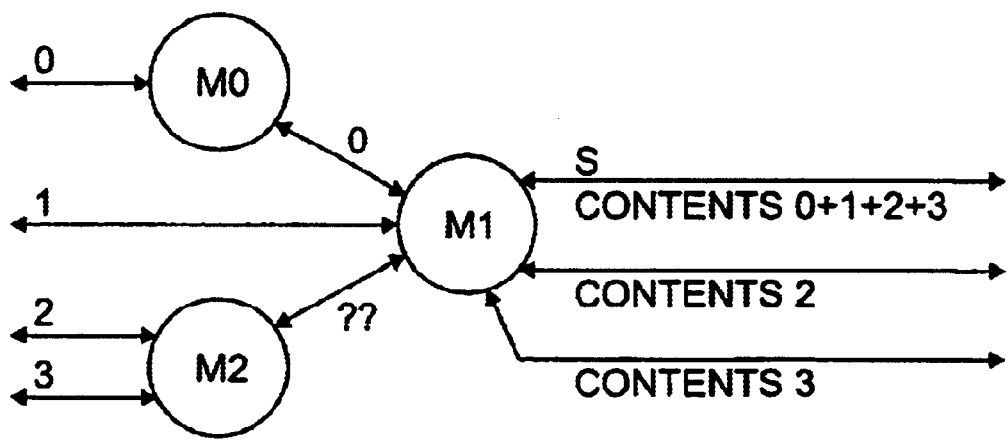

The MCF of the present invention may provide a collection of "supplied" devices that are useful in a wide range of advanced telephony services. For example, one such device may provide DTMF recognition functions. A DTMF device of this type may be inserted into a stream in the manner illustrated in FIG. 24, allowing interpretation of DTMF commands entered by participant a via the device A.

In order to ensure that participant c cannot hear the DTMF commands entered by participant a, the DTMF device may be configured to provide DTMF stripping functions. A user can instruct the DTMF device to, e.g., strip all DTMF from the input stream before copying it to the output stream. If the RTP stream adheres to the DTMF conventions described in http://www.ietf.org/internet-drafts/draft-ietf-avt-dtmf-01.txt, then DTMF detection and stripping can be done efficiently, i.e., without analyzing or modifying the actual audio bytes in the RTP packets.

The manner in which the media switch 20 may be implemented in the illustrative embodiment will now be described in greater detail. A number of different strategies will be described, ranging from an easy-to-explain nondistributed implementation that is efficient enough for many purposes, to a more scalable distributed implementation that can in certain cases also be easier to implement.

In the nondistributed implementation, the media switch 20 is implemented as a single entity which handles all the streams involved in one or more calls, and the switch itself contains all the needed mixing functionality. For scalability in this implementation, different switches may handle different calls. The principal function of the switch in the nondistributed implementation is to update the contents of each receive flow in response to requested changes to the permit sets and the want sets. A number of algorithms for this content-update process are given below. In the following, it should be kept in mind that the switch reads send flows and writes receive flows.

A basic update algorithm that is reasonably efficient will be presented first, followed by optimizations of the basic algorithm. The following terms will be used (s is a stream):

1. call(s): the call containing s;
2. owner(s): the participant that owns s;
3. permit(s): the permit set for s;
4. want(s): the want set for s; and
5. contents(s): the set of streams whose send flows the switch should mix onto s's receive flow.

If ŝ is the set of streams handled by the switch handling s, then contents(s) can be expressed as follows:

contents(s)={t∈ŝ|call(s)=call(t) ∧ owner(t) ∈ want(s) ∧ owner(s) ∈ permit(t)}

It can be shown that every change that can possibly affect any contents set falls into exactly one of the following four categories:
1. Change want(s). In this case, the only receive flow whose contents can change is s. It can be shown that Algorithm 1 below correctly updates contents(s).
2. Change permit(s). It can be shown that Algorithm 2 below correctly updates all the affected contents sets.
3. Create stream s. Recall that the default values of permit(s) and want(s) are the empty set. Hence, this change cannot affect any existing contents set, and the initial value of contents(s) is the empty set.
4. Delete stream s. To update all the contents sets, it is sufficient to change the permit set of s to the empty set and update as shown in Algorithm 2 below.

When the media control switch 20 receives a request from a participant, it decomposes that request into a sequence of zero or more of the above changes and updates all the contents sets using the stated algorithms (or one of their optimizations described below). Then, for each contents(s) that has changed, the switch modifies its mixing function for s as appropriate.

Algorithm 1, which updates an affected contents set in response to a change in to want(s), is as follows.

---
Algorithm 1
---
updateContentsAfterWantChange (s, oldWantSet, newWantSet)
1.   for each participant p on this switch
2.     let pInOld be true if p is in oldWantSet
3.     let pInNew be true if p is in newWantSet
4.     if pInNew and not pInOld
5.       for each stream t owned by p
6.         if s and t are in the same call
7.           if owner(s) is in permit(t)
8.             add t to contents(s)
9.     else if pInOld and not pInNew
10.      for each stream t owned by p
11.        if s and t are in the same call
12.          remove t (if present) from contents(s)

Algorithm 2, which updates affected contents sets in response to change to permit(s), is as follows.

---
Algorithm 2
---
updateContentsAfterPermitChange (s, oldPermitSet, newPermitSet) :
1.   for each participant p on this switch
2.     let pInOld be true if p is in oldPermitSet
3.     let pInNew be true if p is in newPermitSet
4.     if pInNew and not pInOld
5.       for each stream t owned by p
6.         if s and t are in the same call
7.           if owner(s) is in want(t)
8.             add s to contents(t)
9.     else if pInOld and not pInNew
10.      for each stream t owned by p
11.        if s and t are in the same call
12.          remove s (if present) from contents(t)

Note that the contents sets for different streams might be the same. The media switch 20 detects that fact and performs the required mixing function only once. More generally, the mixing functions for different streams might have common subexpressions. For example, the mixing function for $t_1$ might be $s_1+s_2+s_3$ and the mixing function for $t_2$ might be $s_1+s_2+s_4$, with $s_1+s_2$ a common subexpression. The mixer functionality of the switch may be configured to exploit such common subexpressions. However, given that different implementations of the MCF may use different implementations of mixer functionality, the particular manner in which a switch exploits common subexpressions may vary depending on the particular implementation.

Algorithms 1 and 2 above are similar, and can be merged into an Algorithm 3 as follows:

---
Algorithm 3
---
updateContentsAfterPermitOrWantChange (s, oldSet, newSet, isPermitChange) :
1.   for each participant p on this switch
2.     let pInOld be true if p is in oldSet
3.     let pInNew be true if p is in newSet
4.     if pInNew and not pInOld
5.       for each stream t owned by p
6.         if s and t are in the same call
7.           if isPermitChange
8.             if owner(s) is in want(t)
9.               add s to contents(t)
10.          else
11.            if owner(s) is in permit(t)
12.               add t to contents(s)
13.     else if pInOld and not pInNew
14.      for each stream t owned by p
15.        if s and t are in the same call
16.          if isPermitChange
17.            remove s (if present) from contents(t)
18.          else
19.            remove t (if present) from contents(s)

A number of optimizations of Algorithm 3 will now be described. A stream t is referred to as "relevant" for s if t is in the same call as s. Because of the tests on lines 6 and 15 of Algorithm 3, irrelevant streams cannot possibly affect any contents set. A participant p is referred to as "relevant" for s if p has one or more streams that are relevant for s. Irrelevant participants cannot possibly affect any contents set. However, line 1 iterates through all participants on the switch, even irrelevant ones (of which there might be many). Furthermore, if the test on line 4 or 13 is satisfied (which it might often be, even for irrelevant participants), then line 5 or 14 iterates through all of p's streams, even irrelevant ones.

These inefficiencies can be eliminated by maintaining two mapping functions, also referred to herein as "maps," each of which may be implemented in the form of a cache. The first map, relevantParticipants, maps a given call ID to the set of participants having one or more streams in that call. The second map, relevantStreams, maps a given pair (participant, call ID) to the set of streams owned by that participant and in that call. Optimizing Algorithm 3 using these two maps functions results in Algorithm 4 below.

---
Algorithm 4
---
updateContentsAfterPermitOrWantChange' (s, oldSet, newSet, isPermitChange) :
1.   let c = call(s)
2.   for each participant p in relevantParticipants(c)
3.     let pInOld be true if p is in oldSet
4.     let pInNew be true if p is in newSet
5.     if pInNew and not pInOld
6.       for each stream t in relevantStreams(p, c)
7.         if isPermitChange
8.           if owner(s) is in want(t)
9.             add s to contents(t)

Algorithm 4
-continued

```
10.         else
11.            if owner(s) is in permit(t)
12.               add t to contents(s)
13.         else if pInOld and not pInNew
14.            for each stream t in relevantStreams(p, c)
15.               if isPermitChange
16.                  remove s (if present) from contents(t)
17.               else
18.                  remove t (if present) from contents(s)
```

Maintaining the maps relevantParticipants and relevantStreams is straightforward. They can be affected only when a stream is created or deleted. It can be shown that Algorithms 5 and 6 below correctly update the maps in those situations. Algorithm 5 updates the maps in response to stream creation, and Algorithm 6 updates the maps in response to stream deletion.

Algorithm 5

```
updateMapsAfterStreamCreate(s) :
1. let c = call(s)
2. let p = owner(s)
3. add p to relevantParticipants(c)
4. add s to relevantStreams(p, c)
```

Algorithm 6

```
updateMapsAfterStreamDelete(s) :
1. let c = call(s)
2. let p = owner(s)
3. remove s from relevantStreams(p, c)
4. if relevantStreams(p, c) is empty
5.    remove p from relevantParticipants(c)
```

Combining the algorithms described thus far results in Algorithm 7 below, which the media control switch 20 uses to efficiently update the contents sets, maps, and mixing functions in response to a user request.

Algorithm 7

1. Decompose the user request into a sequence of zero or more of the following changes:
   - Change want(s). Execute Algorithm 4.
   - Change permit(s). Execute Algorithm 4.
   - Create stream s. Initialize permit(s) and want(s) to the empty set, then execute Algorithm 5.
   - Delete stream s. Change permit(s) to the empty set, then execute Algorithm 4, then execute Algorithm 6, then delete the stream.
2. For each contents(s) that has changed, update the mixing function for s accordingly.

In the above-described nondistributed implementation, the media switch 20-itself contains all the needed mixing functionality. In practice it is often necessary or convenient to implement the switch 20 as a distributed system.

Figure 19:
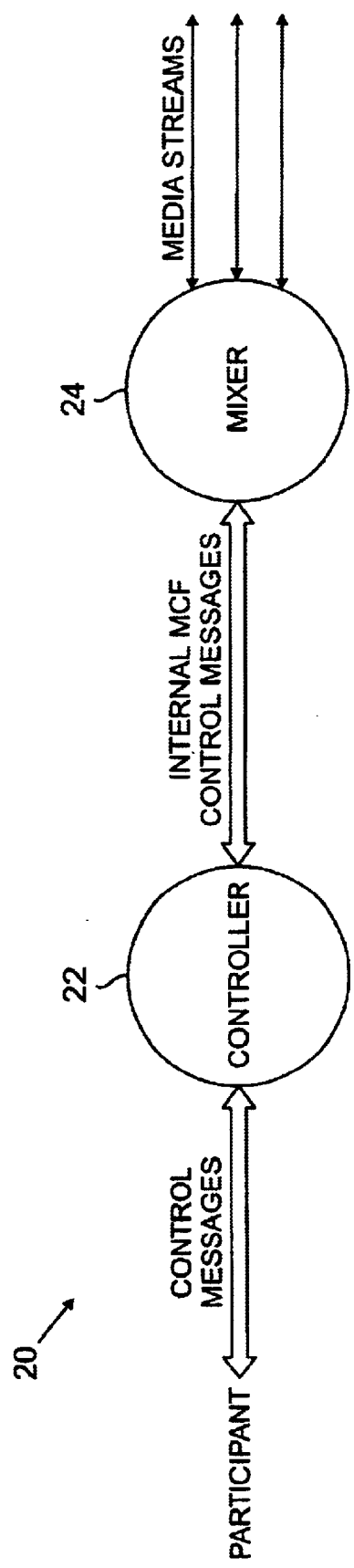
FIGS. 19 and 20 show examples of distributed implementations of a media switch in accordance with the present invention.

FIG. 19 shows an example of a media switch 20 implemented in a distributed manner in accordance with the invention. The switch 20 in this embodiments comprises a switch controller 22 and a mixer 24. The mixer 24 handles the actual media streams and implements the needed mixing functionality, while the controller 22 performs all other functions. Users of a distributed media switch exchange MCF messages with the switch controller. Users generally cannot tell (except by examining the actual IP addresses) that the switch is distributed rather than nondistributed. When a user sends a createStream, deleteStream, pushDevice, or popDevice request to the controller 22, the controller 22 relays that request to the mixer 24.

When the user sends a permit-set or want-set request to the controller 22, the controller updates the contents sets using one or more of the algorithms described above. For each contents set that has changed, the controller sends the mixer a setContents message with the new contents.

This distributed implementation has two main advantages over the nondistributed implementation. First, it is possible to execute the switch controller 22 and the mixer 24 on different hosts. For example, the controller can execute on a general-purpose computer, while the mixer executes on special-purpose hardware designed specifically for mixing. Second, given an independently developed, stand-alone mixer, building a distributed media switch is generally easier than building a nondistributed one. Of course, not every independently developed mixer can be a used, without modification, in a distributed media switch. For example, in the illustrative embodiment the mixer must support the createStream, deleteStream, pushDevice, popDevice, and setContents requests that the controller will send it, as will be described in greater detail below. However, modifying an independently developed mixer to support these requests is usually easier than incorporating an independently developed mixer into a nondistributed media switch.

Figure 20:
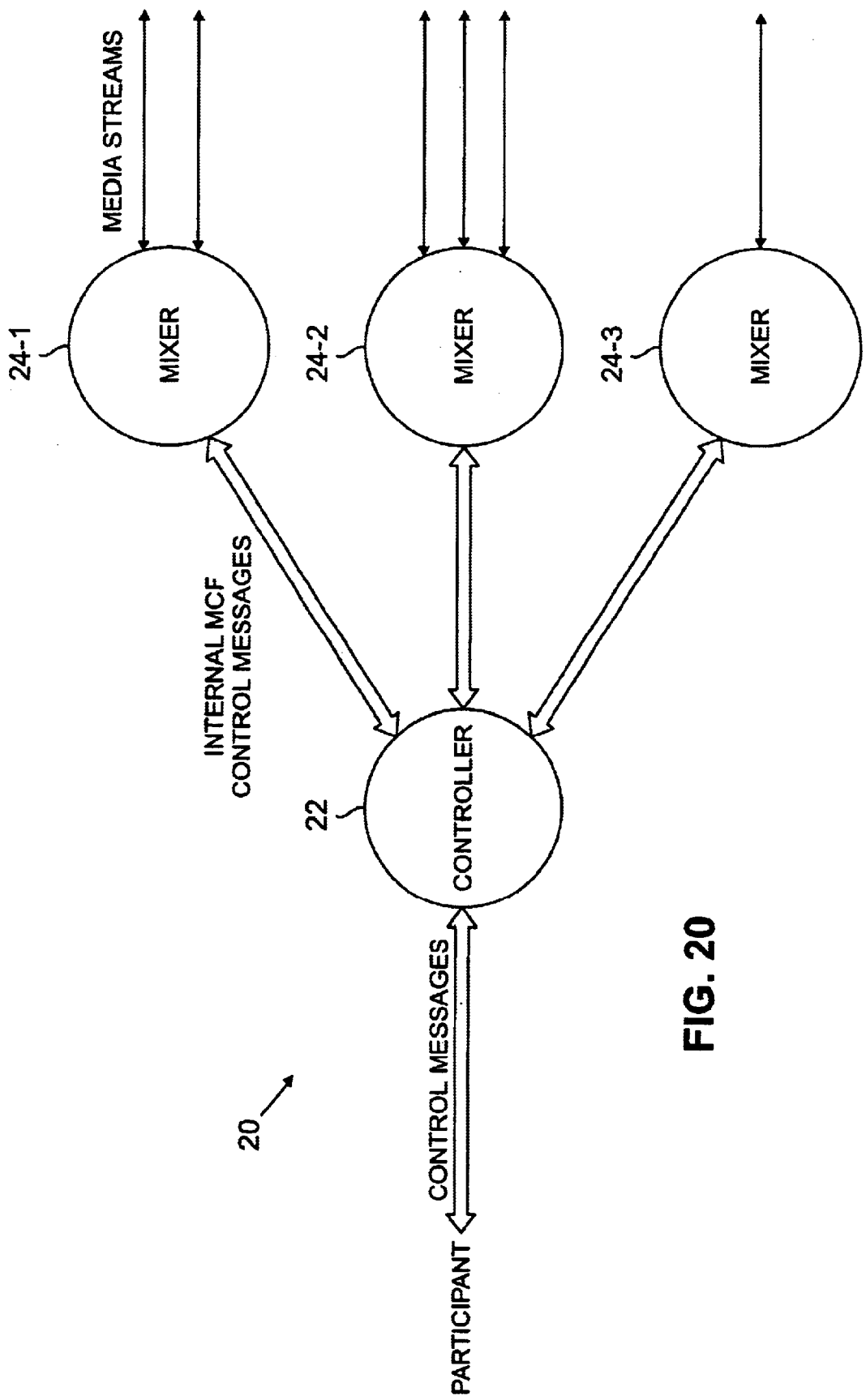

FIG. 20 shows a distributed implementation of a media switch 20 in accordance with the present invention using multiple mixers 24-1, 24-2 and 24-3. The multiple mixers are each coupled to the switch controller 22 as shown.

When the controller 22 receives a request from a participant to create a new stream s, the controller selects an unloaded mixer M to handle the stream. The switch controller calculates contents(s) using the algorithms described previously. In general, contents(s) will be a mix of send flows, some of which are handled by M and others of which are handled by other mixers.

Figure 21:
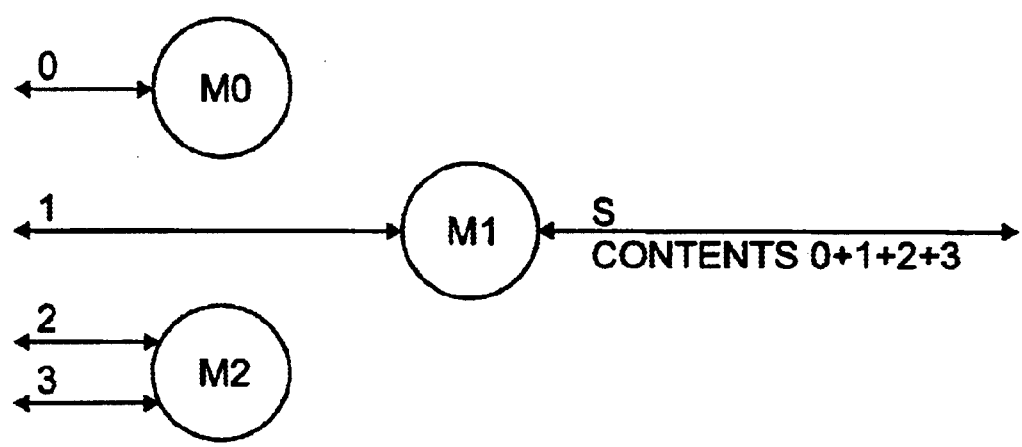
FIGS. 21–24 show examples of stream mixing in a multiple-mixer media switch implementation in accordance with the invention.

Consider by way of example the case shown in FIG. 21 in which contents(s) is $\{0, 1, 2, 3\}$, where stream 0 is handled by mixer M0, stream 1 by mixer M1 and streams 2 and 3 by mixer M2. This distributed system can generate the mix 0+1+2+3 on s in one of a number of different ways, as will be described below.

Figure 22:
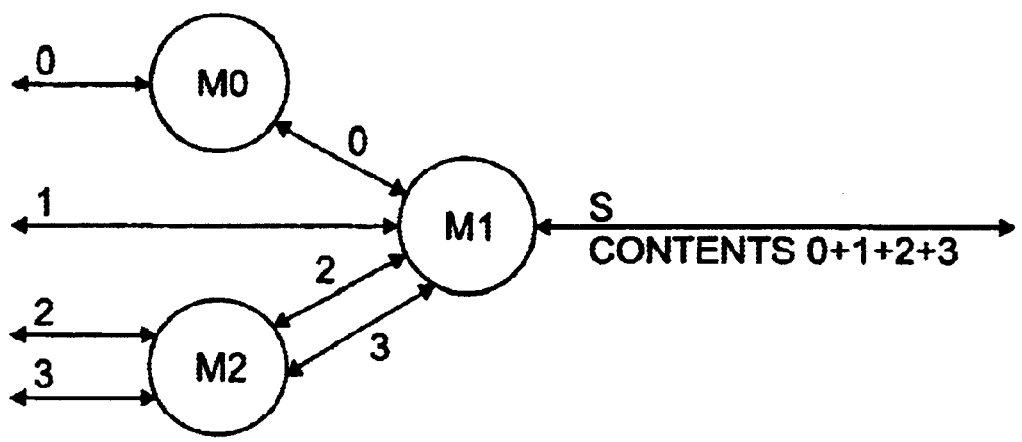

One possible way to implement distributed mixing is for the switch controller 22 to arrange for mixer M0 to relay stream 0 to mixer M1 and for mixer M2 to relay streams 2 and 3, as shown in FIG. 22. The controller can do that by sending mixers M0, M1 and M2 the appropriate sequence of createStream and setContents commands.

Figure 23:
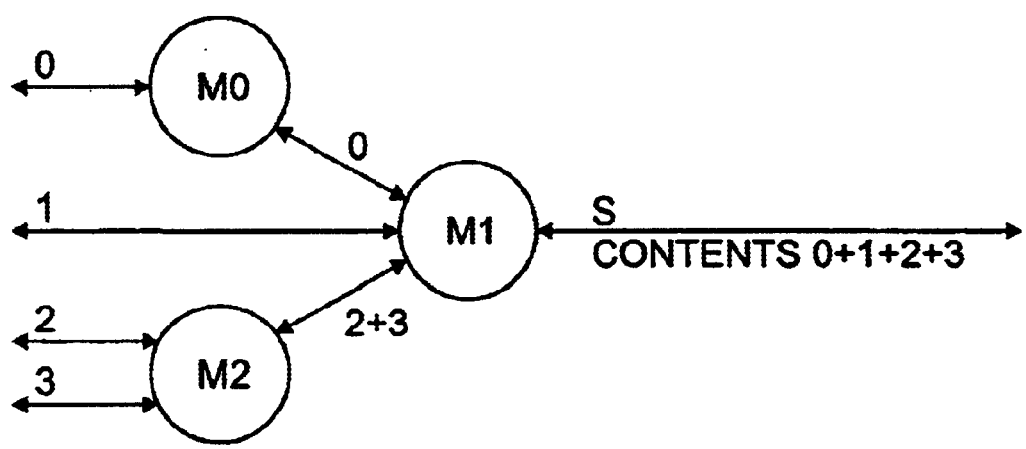

It should be noted, however, that the number of streams that must travel through the network can be reduced by first mixing streams 2 and 3 in mixer M2 and then relaying the mix to mixer M1 for further mixing with streams 0 and 1, as shown in FIG. 23. The controller can do this by sending mixers M1 and M2 the appropriate sequence of commands. Unfortunately, determining what to mix and where to mix it such that the total number of streams is minimized, i.e., the distributed-mix problem, is difficult. Consider as an example the situation shown in FIG. 24. This situation is the same as that shown in FIG. 23, except that M1 generates two additional streams. In this situation, mixing stream 1 and 2 at mixer M2 would actually increase the number of streams that M2 must send to M1. It can be shown that the distributed-mix problem is NP-complete. Hence, a multiple-mixer implementation of the MCF of the present invention generally cannot be expected to minimize the total number of media streams, although approximation algorithms may be used.

It may be preferred in many applications to implement distributed mixing using IP multicasting. In this case, when the switch controller 22 receives a request to create a new send stream s, the controller assigns to s an unused multicast transport address, i.e., a multicast group ID and port number. The controller then selects an unloaded mixer M and relays the createStream request to M, along with the multicast address. M receives s on that address instead of on an address that M selects. Now, when some other mixer M' needs s as part of a mix that M' is generating, M' joins the multicast group for s and reads s on the multicast transport address assigned to s.

Notice that this use of IP multicast, unlike the conventional use described previously, does not result in a confusing "backwards" protocol. Furthermore, there is no danger of users not adhering to it, in that MCF users don't even know, unless they examine the actual IP addresses, that multicast is being used in the MCF implementation.

There are two drawbacks to this approach, however. First, as mentioned previously, multicast isn't yet widely implemented. Second, it is not clear in this scheme how to select the multicast transport address for a stream. A common, but not universal, convention is to assign a single multicast group ID to an application. If the MCF of the present invention adheres to this convention, all streams handled by all executing instances of MCF generally must use the same group ID. Those streams must then be distinguished solely by port number. The MCF can choose. the port numbers to guarantee that they're all different by, e.g., (1) preassigning aport-number range to each executing instance of MCF, or (2) providing a single universal port-number server for MCF that all instances of MCF query to get port numbers. Unfortunately, both of these approaches may be undesirable. As an alternative, one may select the port number based upon a hash function of, e.g., the host IP address, time of day, and a random number. The closer to perfect the hash function, the higher the odds that the chosen port number is unique. Additional details regarding the multicast-address-assignment process are available through, e.g., the IETF working group "malloc," http://www.ietf.org/internet-drafts/draft-ietf-malloc-arch-01.txt.

The controller-mixer interface in the distributed implementations of the media switch 20 will now be described in greater detail. The interface is defined in terms of the messages that a mixer receives from the controller and sends to the controller. Although any encoding of those messages is feasible, it may be preferable to implement the controller using an encoding that is easy for C and C++ programs to implement. For simplicity of illustration, the messages will be described using Java. It should be noted that for mixers having an MGCP interface, the messages described herein may be implemented in a separate MGCP package named mcf.

TABLE 1 below enumerates the MCF controller-mixer message types. The mixer reads send flows and writes receive flows.

TABLE 1

MCF controller-mixer message types.

| Message type | sender | description |
| --- | --- | --- |
| createStream | controller | create stream |
| createStreamAck | mixer | ack createStream |
| deleteStream | controller | delete stream |
| popDevice | controller | pop stream's stack |
| pushDevice | controller | push device onto stream's stack |
| pushDeviceAck | mixer | ack for pushDevice |
| changeAddress | controller | change send or receive address for flow |
| setContents | controller | modify stream's mixing function |

The arguments of the createStream message are as follows:

String streamID;

String receiveHost;

int receivePort;

String sendHost;

int sendPort;

When the mixer receives a createStream, it should create a new stream with the specified ID. The mixer should set the stream's send and receive addresses to the specified values. The mixer should initialize the stream's contents to the empty set. The mixer should then send the controller a createStreamAck. The arguments of createStreamAck are as follows:

String streamID;

int mixerPort;

boolean success.;

The argument success is true if the mixer was able to create the specified stream, in which case mixerPort is the mixer's port for the stream.

The arguments of deleteStream are as follows:

String streamID;

When the mixer receives a deleteStream, it should delete the specified stream and recover all resources associated with it.

The arguments of setcontents are as follows:

String streamID;

Set contents;

The argument contents contains a set of stream IDs. When the mixer receives set Contents, it should set the mix function for the specified stream's receive flow (which the mixer is writing) to the sum of the send flows for all the streams specified in contents.

The arguments of popDevice are as follows:

String streamID;

When the mixer receives a popDevice, it should pop (if possible) the stack for the specified stream.

The arguments of pushDevice are as follows:

String streamID;

int requestID;

String deviceClassName;

When the mixer receives a pushDevice, it should push a device of the specified type onto the stack for the specified stream. The mixer should then send the controller a pushDeviceAck. The arguments of pushDeviceAck are as follows:

String streamID;

int requestID; boolean success;

The argument requestID should be set to the requestID in the pushDevice message.

The argument success is true if the mixer was able to perform the requested push on the requested stream.

Finally, the arguments of changeAddress are as follows:

String streamID;

String sendHost;

int sendPort;

String receiveHost;

int receivePort;

When the mixer receives a changeAddress, it should change the specified stream's send and receive addresses as specified.

Notice that none of the MCF controller-mixer messages contains a call ID. All logic that depends on call IDs (for example, updating the contents sets) is performed in the controller, not the mixer. Thus, the mixer does not need to know to which call a particular stream belongs.

An example of an application-programming interface (API) for the MCF of the present invention will now be described in greater detail. The API is written in Java (version 2) and is contained in the package com.lucent.mcf.

To start an MCF media switch, create an instance of the Switch class.

```
public class Switch {
    public static final int PORT;
    public Switch(int port);
    public static void main( );
}
```

The constructor starts a switch that listens on the specified TCP port for new participants. The value PORT is the default port. The main method simply creates a switch on the default port.

To become a participant of an MCF media switch, create an instance of the class Participant.

```
public class Participant {
    public void addListener(ParticipantEventListener lis);
    public void connect(String switchHost, int switchPort);
    public String getID();
    public Collection getStreams();
    public void removeListener(ParticipantEventListener lis);
}
```

The method connect connects the participant to the MCF media switch that is listening on the specified host and port number. Before connecting, the user should call addListener to add the specified object to the set of objects listening for asynchronous events related to this participant. The method removeListener removes a listener that was added by addListener. The method getStreams returns an unmodifiable Collection containing all the streams that the participant owns. As described previously, the media switch in the illustrative embodiment assigns each of its participants a unique ID. The method get ID returns the participant's ID, or null if that ID isn't known yet.

The ParticipantEventListener interface is as follows:

```
public interface ParticipantEventListener extends
EventListener {
    void devicePushed(DevicePushedEvent event);
    void contentsChanged(ContentsChangedEvent event);
    void idAssigned(IDAssignedEvent event);
    void streamCreated(StreamCreatedEvent event);
}
```

The method devicePushed is invoked whenever the switch has successfully or unsuccessfully pushed a device onto a stream. The method contentsChanged is invoked whenever the switch has modified the contents of a stream as the result of a change in some permit or want set. The method idAssigned is invoked when a participant has been assigned an ID by the switch. The method streamCreated is invoked when the switch has successfully or unsuccessfully created a stream.

The class Stream represents a bidirectional media stream.

```
public class Stream {
    public Stream(Participant owner, String callID, String
        receiveHost,int receivePort, String sendHost, int
        sendPort);
    public void close();
    public String getCallID();
    public String getReceiveHost();
    public int getReceivePort();
    public String getSendHost();
    public int getSendPort();
    public Participant getOwner();
    public ParticipantSet getPermitSet();
    public String getSwitchHost();
    public int getSwitchPort();
    public ParticipantSet getWantSet();
    public void popDevice();
    public void pushDevice(String deviceClassName, String
initArg);
    public void setReceiveAddress(String host, int port);
    public void setSendAddress(String host, int port);
    public void setPermit(ParticipantSet set);
    public void setWant(ParticipantSet set);
}
```

The first constructor creates a stream. The argument call ID is a string that is chosen to represent the call containing the stream; MCF doesn't interpret the contents of that string. The arguments receiveHost and receivePort comprise the stream's receive address; the arguments sendHost and sendPort comprise the stream's send address. When the API learns the stream's switch address, the API invokes the method ParticipantEvent Listener.streamCreated on all registered listeners.

The method close destroys the stream, such that the switch will free all its resources associated with the stream. The method getCallID returns the ID of the call containing the stream. The methods getReceiveHost and getReceivePort return the host and port for the stream's receive address. The methods getSendHost and getSendPort return the host and port for the stream's send address. The method getOwner returns the stream's owner. The methods getSwitchHost and getSwitchPort return the host and port for the stream's switch address. The method getPermitSet (or getWantSet) returns an unmodifiable version of the stream's permit (or want) set. The method setSendAddress (or setReceiveAddress) changes the stream's send (or receive) address. The method setPermit (or setWant) sets the stream's permit (or want) set.

The method pushDevice pushes onto the stream's stack a new instance of the specified type of device. As noted previously, the type deviceClassName extends the Pushable-Device class. When the push operation completes (either successfully or unsuccessfully), the API invokes the method ParticipantEventListener.devicePushed on all registered listeners. The method popDevice pops (if possible) the top device from the switch's stack for this stream.

Permit and want sets are represented by instances of the ParticipantSet class.

```
public class ParticipantSet {
    public boolean getAll();
    public Set getExplicits();
    public void setAll();
    public void setExplicits(Collection col);
```

As noted previously, permit and want sets can be specified in either an explicit list of participant identifiers, or using the special value all, together with an explicit list of participant identifiers.

To create a set in the first form, the setExplicits method may be used. To create a set in the second form, the setAll and setExplicits methods may be used.

It should be noted that the MCF of the present invention may be implemented within a larger telephony-services framework, such as, e.g., a higher-level programming framework.

The above-described embodiments of the invention are intended to be illustrative only. For example, although described in conjunction with particular types of telephony services, the invention is more generally applicable for use in the implementation of any desired type of telephony service. In addition, the particular-arrangement of system components in the illustrative embodiment can be varied in a straightforward manner to accommodate the specific needs of a particular implementation. The components described herein can be implemented in various conventional combinations or arrangements of hardware, software or firmware. For example, one or more of the MCF components described herein may be implemented at least in part in the form of one or more software programs which are configured to run on one or more computers, workstations or other types of data processing devices. These and numerous other alternative embodiments may be devised by those skilled in the art without departing from the scope of the following claims.

What is claimed is:

1. A method of providing telephony services, the method comprising the steps of:

establishing a connection between each of one or more participants in a given communication and a media switch operative to control one or more media-streams associated with the communication; and implementing a telephony service by controlling in the media switch the one or more media streams in accordance with one or more permit sets and one or more want sets, each of the permit sets and each of the want sets being associated with a given media stream of a given participant, a particular one of the permit sets specifying one or more additional participants that are permitted to receive a send flow of the given stream in conjunction with the telephony service, and a corresponding one of the want sets specifying one or more additional participants from which the given participant wants to receive a receive flow of the given stream in conjunction with the telephony service.

2. The method of claim 1 wherein the given participant establishes the connection with the media switch by opening a control channel to a port of the switch, such that control messages can be exchanged between the switch and a device associated with the participant.

3. The method of claim 2 wherein the device generates the send flow and receives the receive flow of the given media stream associated with the given participant.

4. The method of claim 1 wherein at least a subset of the streams controlled by the media switch are transported in accordance with a real-time protocol (RTP).

5. The method of claim 1 wherein the communication comprises a telephone call.

6. The method of claim 1 wherein every media stream handled by the media switch at a given point in time is associated with a single on-going communication.

7. The method of claim 1 wherein multiple media switches are utilized to control the media streams associated with multiple on-going communications.

8. The method of claim 1 wherein the media switch utilizes the permit sets and the want sets to generate onto each receive flow for the one or more media streams the mix of all the send flows for the one or more media streams that satisfy the specified permissions and wants.

9. The method of claim 1 wherein a device is inserted into one of the receive or send flows by a corresponding participant sending a control message to the media switch directing the media switch to change a receive address or a send address of the corresponding stream to an address associated with the device.

10. The method of claim 1 wherein the media switch allows a device to be inserted into one of the receive or send flows by a corresponding participant by the participant directing the media switch to internally apply one or more operations of the inserted device to the corresponding media stream.

11. The method of claim 10 wherein the media switch maintains for each of the streams controlled thereby a stack storing information regarding devices inserted into send or receive flows by a corresponding participant.

12. The method of claim 1 wherein the media switch is implemented in a nondistributed manner as a single entity which handles all of the media streams involved in one or more communications.

13. The method of claim 1 wherein the media switch is implemented in a distributed manner and comprises a switch controller and one or more mixers.

14. The method of claim 13 wherein the media switch comprises a plurality of mixers, with each of the mixers handling a subset of the media streams controlled by the media switch.

15. An apparatus for providing telephony services, the apparatus comprising:

a media switch operative to control one or more media streams associated with a given communication, each of one or more participants in the given communication establishing a connection with the media switch, the media switch being further operative to implement a telephony service by controlling the one or more media streams in accordance with one or more permit sets and one or more want sets, each of the permit sets and each of the want sets being associated with a given media stream of a given participant, a particular one of the permit sets specifying one or more additional participants that are permitted to receive a send flow of the given stream in conjunction with the telephony service, and a corresponding one of the want sets specifying one or more additional participants from which the given participant wants to receive a receive flow of the given stream in conjunction with the telephony service.

16. The apparatus of claim 15 wherein the given participant establishes the connection with the media switch by opening a control channel to a port of the switch, such that control messages can be exchanged between the switch and a device associated with the participant.

17. The apparatus of claim 16 wherein the device generates the send flow and receives the receive flow of the given media stream associated with the given participant.

18. The apparatus of claim 15 wherein at least a subset of the streams controlled by the media switch are transported in accordance with a real-time protocol (RTP).

19. The apparatus of claim 15 wherein the communication comprises a telephone call.

20. The apparatus of claim 15 wherein every media stream handled by the media switch at a given point in time is associated with a single on-going communication.

21. The apparatus of claim 15 wherein multiple media switches are utilized to control the media streams associated with multiple on-going communications.

22. The apparatus of claim 15 wherein the media switch utilizes the permit sets and the want sets to generate onto each receive flow for the one or more media streams the mix of all the send flows for the one or more media streams that satisfy the specified permissions and wants.

23. The apparatus of claim 15 wherein a device is inserted into one of the receive or send flows by a corresponding participant sending a control message to the media switch directing the media switch to change a receive address or a send address of the corresponding stream to an address associated with the device.

24. The apparatus of claim 15 wherein the media switch allows a device to be inserted into one of the receive or send flows by a corresponding participant by the participant directing the media switch to internally apply one or more operations of the inserted device to the corresponding media stream.

25. The apparatus of claim 24 wherein the media switch maintains for each of the streams controlled thereby a stack storing information regarding devices inserted into send or receive flows by a corresponding participant.

26. The apparatus of claim 15 wherein the media switch is implemented in a nondistributed manner as a single entity which handles all of the media streams involved in one or more communications.

27. The apparatus of claim 15 wherein the media switch is implemented in a distributed manner and comprises a switch controller and one or more mixers.

28. The apparatus of claim 27 wherein the media switch comprises a plurality of mixers, with each of the mixers handling a subset of the media streams controlled by the media switch.

29. A machine-readable medium storing one or more software programs for use in implementing telephony services, the one or more software programs when executed providing a media switch operative to control one or more media streams associated with a given communication, each of one or more participants in the given communication establishing a connection with the media switch, the media switch being further operative to implement a telephony service by controlling the one or more media streams in accordance with one or more permit sets and one or more want sets, each of the permit sets and each of the want sets being associated with a given media stream of a given participant, a particular one of the permit sets specifying one or more additional participants that are permitted to receive a send flow of the given stream in conjunction with the telephony service, and a corresponding one of the want sets specifying one or more additional participants from which the given participant wants to receive a receive flow of the given stream in conjunction with the telephony service.

* * * * *